3,840,528
AZOLE COMPOUNDS

Shuichi Seino, Osaka, Tomizo Fujino, Suita, and Kakuji Tonegawa, Kyoto, Japan, assignors to Osaka Seika Kogyo Kabushiki Kaisha, Osaka, and Nippon Kayaku Kabushiki Kaisha, Tokyo, Japan
No Drawing. Continuation-in-part of application Ser. No. 743,303, July 9, 1968, now Patent No. 3,637,672. This application Aug. 17, 1971, Ser. No. 172,555
Int. Cl. C09b 23/14
U.S. Cl. 260—240 D          12 Claims

ABSTRACT OF THE DISCLOSURE

Azole compounds useful for optical brightening agents for synthetic fibers represented by the formula,

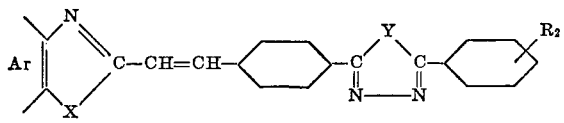

wherein

Ar is unsubstituted benzene nucleus, unsubstituted naphthalene nucleus or benzene nucleus substituted by one methyl, methoxy, ethoxy, chlorine, phenyl, carboethoxy or ethylsulfonyl group;
$R_2$ is a hydrogen or chlorine atom or a lower alkyl or methoxy group;
X is oxygen, sulfur, NH group or N-$CH_3$ group; and
Y is oxygen or sulfur.

CROSS REFERENCE TO RELATED APPLICATIONS

This is a continuation-in-part of co-pending application Ser. No. 743,303, filed on July 9, 1968, now U.S. Pat. 3,637,672, granted Jan. 18, 1972.

The present invention relates to azole compounds represented by general formula (1) depicted below.

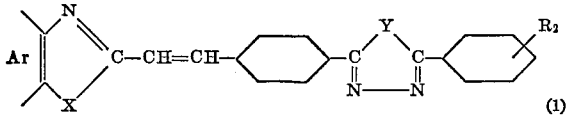

wherein

Ar is unsubstituted benzene nucleus,, unsubstituted naphthalene nucleus or benzene nucleus substituted by one methyl, methoxy, ethoxy, chlorine, phenyl, carboethoxy or ethylsulfonyl group;
$R_2$ is a hydrogen or chlorine atom or a lower alkyl or methoxy group;
X is oxygen, sulfur, NH group or N-$CH_3$ group; and
Y is oxygen or sulfur.

The azole compounds of the present invention are used as fluorescent brightening agents for organic materials, particularly such synthetic fibers as polyester, polyamide, cellulose acetate, polyacrylonitrile, polyolefin and polyvinyl alcohol, and such synthetic resins as polyvinyl chloride, polystyrene, polyacrylonitrile, polyamide, polycarbonate and urea resin.

Various methods can be thought of for producing the compounds of general formula (1), but the following methods are preferred.

1. A compound of the formula:

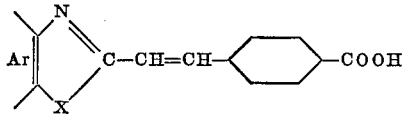

is treated with a halogenating agent, such as thionyl chloride, phosphorus trichloride, phosphorus pentachloride, phosphorus oxychloride, thionyl bromide or phosphorus pentabromide, in the usual manner to give the corresponding halogenide, which is then treated with aqueous solution of hydrazine to obtain a compound of the following formula:

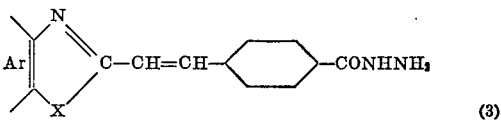

One mol of the compound of formula (3) is reacted with 1 mol of a compound represented by the formula

in an inert solvent in the presence of hydrogen chloride-removing agent, such as pyridine, and a compound of the formula:

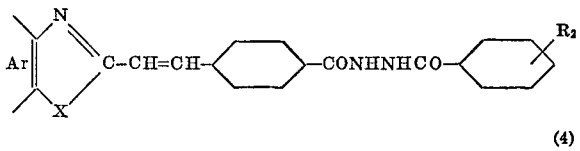

is obtained. The compound thus obtained is heated with the dehydrating agent, such as thionyl chloride, phosphorus oxychloride, phosphorus trichloride, zinc chloride, phosphoric acid or polyphosphoric acid, or with phosphorus pentasulfide, in an organic solvent, eg. chlorobenzene, to close the ring and a compound of the following formula is obtained.

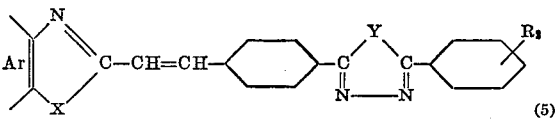

In this case, a compound of formula (5) wherein Y is oxygen is obtained when dehydrating agent is used, while a compound of formula (5) wherein Y is sulfur is obtained when phosphorus pentasulfide is used.

The ring-closing temperature in this method is preferably usually from 100° to 250° C. In this case, a better yield can be obtained by the use of an organic solvent, such as toluene, xylene, dichlorobenzene or trichlorobenzene, in order to avoid unhomogeneous reaction. If desired, the reaction product of formula (5) may be recrystallized from an organic solvent, such as xylene, dichlorobenzene or cyclohexanone.

2. A carboxylic acid represented by the following formula is treated with a halogenating agent to give the corresponding halogenide.

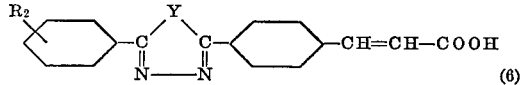

The thus obtained halogenide is reacted with an amino compound of the formula:

to obtain a compound represented by the formula:

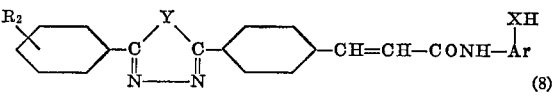

Upon dehydrating and closing the ring of the compound of formula (8), a compound of formula (9) is obtained.

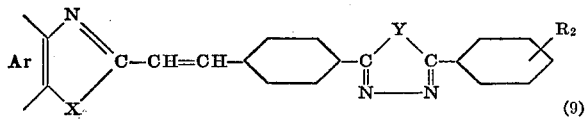

(9)

The compound of formula (6) can be produced by the following two methods:

(A) A compound represented by the formula:

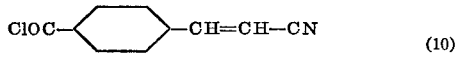

(10)

and a hydrazide compound represented by the formula:

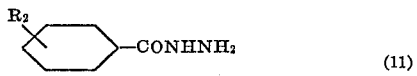

(11)

are condensed by removing hydrogen chloride, or cinnamonitrile-4-carboxylic acid hydrazide represented by the formula

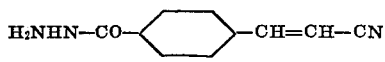

and carboxylic acid chloride represented by the formula

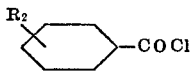

are condensed by removing hydrogen halide, to obtain a compound of the following formula:

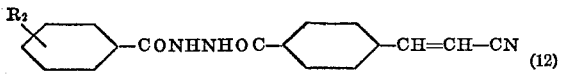

(12)

Then, the ring of the compound is closed and a compound of the formula:

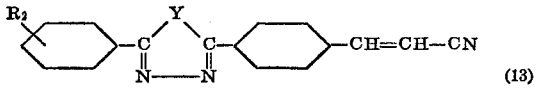

(13)

is obtained. Upon hydrolysis, the compound of formula (6) is produced.

The cinnamonitrile-4-carboxylic acid chloride can be readily obtained by acting chlorinating agent on cinnamonitrile-4-carboxylic acid which can be produced by the Neerwein reaction from p - aminobenzoic acid diazonium salt and acrylonitrile through α-chlorohydrocinnamonitrile-4-carboxylic acid.

(B) The compound of formula (6) is produced by the Neerwein reaction between diazonium salt, obtained by diazotizing a compound of the formula:

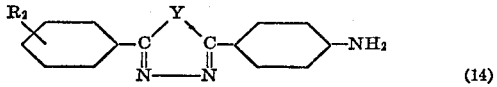

(14)

and acrylonitrile or α,β-unsaturated carboxylic acid, i.e. acrylic acid, fumaric acid, maleic acid or maleic anhydride, wherein when the acrylonitrile is used, the product is the following compound of formula (15) from which hydrogen chloride is removed to obtain the compound of formula (13) which nitrile group is hydrolyzed to obtain the compound of formula (6).

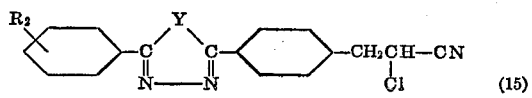

(15)

The manner in which the azole compounds of the present invention are applied to organic materials, is variable depending upon the characteristics of the azole compound used and the type of the organic material to which said azole compound is applied. For dyeing synthetic fibres with an azole type compound which is hard-soluble in water, a known dyeing method is employed. Namely, an aqueous dispersion of azole compound is prepared by the use of a suitable surface active agent, e.g. polyoxyethylene ether-type non-ionic surface active agent or alkylbenzene sulfonic acid-type anionic surface active agent, and the fibres are dipped in said dispersion for brightening. In this case, the treatment temperature is preferably normally in the neighbourhood of 50° to 130° C. in accordance with the fibre materials. As for polyester-type synthetic fibres, the brightening effect may further be improved by adding in the treatment bath a dyeing assistant, such as trichlorobenzene or methyl salicylate. In treating fabrics made of polyester-type synthetic fibre or mixture thereof with cotton, it is preferable to subject the fibres to a hot air treatment according to the so-called pigment padding method. The temperature of 160° to 200° C. is preferably used for such treatment.

As the other method of treating synthetic fibres, the azole compounds of the present invention may be added in the polymers before said polymers are spun into the fibres.

Of the azole compounds of the present invention, those which are soluble in water, e.g. those compounds having sulfonic acid group, are used by the dyeing method which is adapted for use with acid dyes and direct cotton dyes. The compounds of this type are used for natural fibres, such as cotton, wool and silk, and polyamide fibres.

The amount of the azole compounds used in the brightening treatment so far described is preferably selected normally in the range of 0.01 to 0.4% with respect to the amount of the fibre materials.

In use of the azole compounds of the present invention for the brightening treatment of synthetic resins, it is advantageous, for example, to mix the azole compound with the polymer before shaping and then shape the mixture by heat-treating it with a previously heated roll. The temperature in this case is preferably from 130° to 300° C. and the amount of the azole compound used is preferably normally from 0.005 to 2.0%.

Example 1

8.7 g. of a compound represented by the formula,

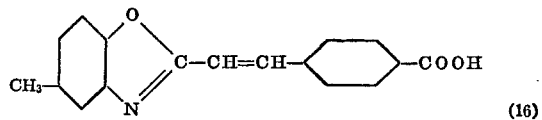

(16)

was stirred in 200 cc. of toluene and 4.5 g. of thionyl chloride until the mixture stops generating hydrochloric acid gas and thereafter 50 cc. of toluene was distilled out to remove excess thionyl chloride. The residue was cooled to 50° C. or below, to which 4.7 g. of benzhydrazide and 3.2 g. of pyridine were added with vigorous stirring and the reaction was carried out for 6 hours at the boiling point (110° C.) Upon cooling, the precipitated crystal was separated, washed with water and dried. 12.0 g. of a compound represented by the formula,

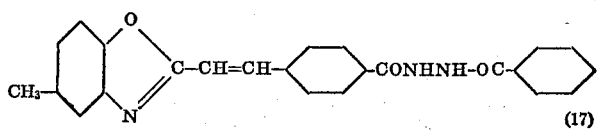

(17)

was obtained,

This compound was reacted with 240 cc. of xylene and 7.2 g. of thionyl chloride at the boiling point (140° C.) until the mixture became transparent and stopped generating hydrochloric acid gas. After cooling the mixture, 10.3 g. of a compound represented by the formula,

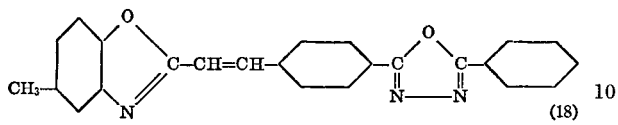

was obtained in the form of a light yellow crystal.

This compound emits a bluish purple fluorescence in dioxane.

$F_{max}$: 416 m$\mu$ (0.000025 g./l. dioxane)
Analysis: C 75.90%, N 11.12%
Calculation: C 75.97%, N 11.08%

When the ring of the compound of formula (17) is closed by removing water therefrom, using 10 g. of phosphorus pentasulfide instead of thionyl chloride, a compound of the formula,

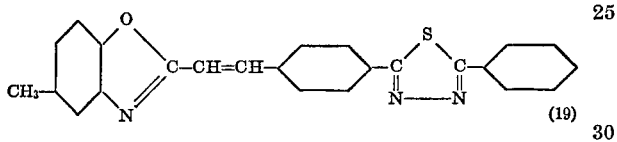

was obtained.

Analysis: C 72.78%, N 10.70%
Calculation: C 72.89%, N 10.63%
$F_{max}$: 423 m$\mu$ Example 2

The process of Example 1 was repeated using 5.7 g. of 4-methoxybenzhydrazide instead of 4.7 g. of benzhydrazide and a compound of the formula,

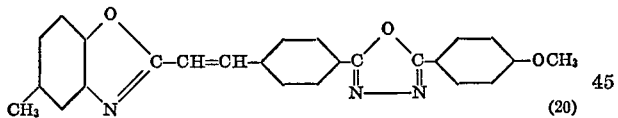

was obtained.

Analysis: C 73.15%, N 10.35%
Calculation: C 73.33%, N 10.26%
$F_{max}$: 419 m$\mu$ This compound was similar to the compound of formula (18) in the light fastness of materials optically brightened by them but was superior to the latter compound in the light fastness of an aqueous dispersion thereof. Thus, when an aqueous dispersion containing 1.5 g./l. of the respective compound prepared by the aid of a polyoxyethylene ether type surface active agent and contained in a hard glass container was exposed to diffused light from a northern window, the compound of formula (18) was 24% decomposed after one day exposure but only 0.7% of the compound of formula (20) was decomposed.

Examples 3 to 18

The process of Example 1 was repeated using the compounds depicted in Column I of Table I below instead of the compound of formula (16), the compounds depicted in Column II of said Table instead of benzhydrazide and the compounds depicted in Column III of said Table instead of thionyl chloride, and the compounds depicted in Column IV of said Table were obtained respectively.

TABLE

| Ex. | I | II | III | IV | $F_{max}$ (0.000025 g./l. dioxane) m$\mu$ | Elementary analysis Obs. C | Obs. N | Cal. C | Cal. N |
|---|---|---|---|---|---|---|---|---|---|
| 3 | ...COOH...C-CH=CH...O/N | Benzhydrazide | Phosphorus oxychloride | ...C-CH=CH...C=N...O/N | 408 | 75.53 | 11.70 | 75.60 | 11.50 |
| 4 | ...COOH...C-CH=CH...HN/N | 2-chlorobenz-hydrazide | Thionyl chloride | ...C-CH=CH...C=N...Cl | 426 | 69.20 | 14.12 | 69.27 | 14.05 |
| 5 | ...COOH...C-CH=CH...O/N...Cl | Benzhydrazide | Phosphorus oxychloride | ...C-CH=CH...C=N...O/N...Cl | 416 | 69.02 | 10.60 | 69.07 | 10.51 |

TABLE I—Continued

| Ex. | I | II | III | IV | $F_{max}$ (0.000025 g/l. dioxane) mμ | Elementary analysis | | | |
|---|---|---|---|---|---|---|---|---|---|
| | | | | | | Obs. | | Cal. | |
| | | | | | | C | N | C | N |
| 6 | [structure with C₂H₅O] | do | | [structure with C₂H₅O] | 417 | 73.30 | 10.28 | 73.33 | 10.26 |
| 7 | [structure] | P-chlorobenzhydrazide | Polyphosphoric acid | [structure with Cl] | 410 | 69.00 | 10.58 | 69.07 | 10.51 |
| 8 | [structure with phenyl] | do | do | [structure with Cl] | 426 | 73.10 | 8.90 | 73.19 | 8.83 |
| 9 | [naphthalene structure] | P-methoxybenzhydrazide | | [structure with OCH₃] | 434 | 75.43 | 9.44 | 75.41 | 9.43 |
| 10 | [structure] | Benzhydrazide | Phosphorous pentasulfide | [structure with S] | 416 | 72.39 | 11.10 | 72.43 | 11.02 |
| 11 | [structure with CH₃] | do | do | [structure with S, CH₃] | 423 | 72.78 | 10.70 | 72.89 | 10.63 |
| 12 | [structure with CH₃O] | do | do | [structure with S, CH₃O] | 425 | 70.00 | 10.26 | 70.06 | 10.21 |

| | Starting material | Reagent | Product | | | | |
|---|---|---|---|---|---|---|---|
| 13 | 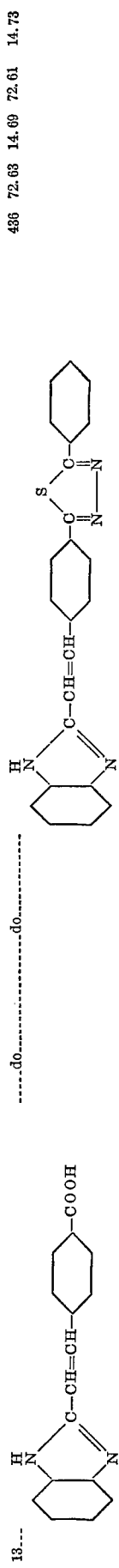 | ...do... | 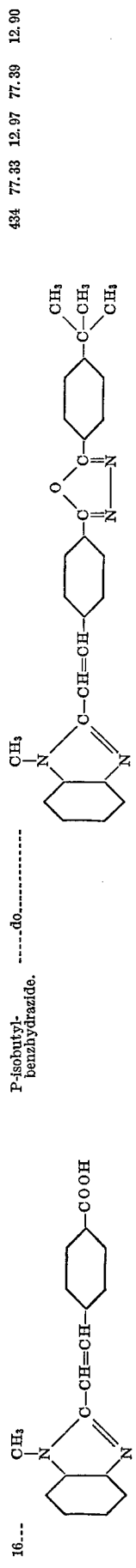 | 436 | 72.63 | 14.69 | 72.61 | 14.73 |
| 14 | 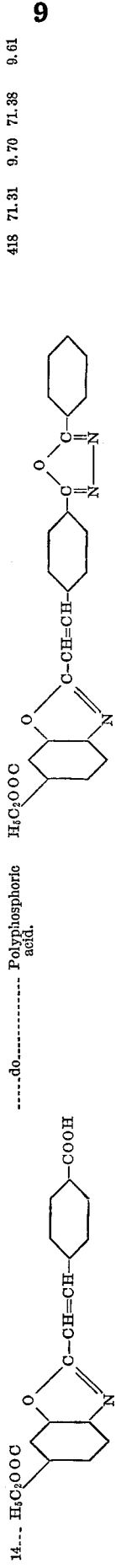 | ...do... Polyphosphoric acid. | 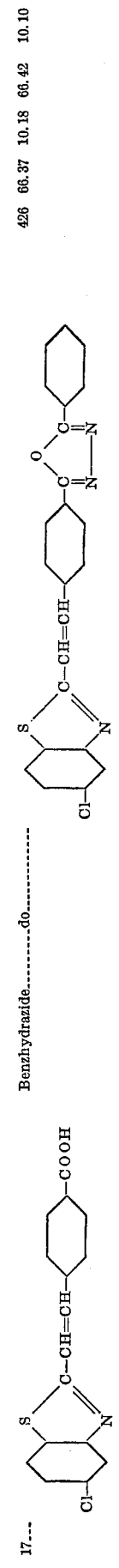 | 418 | 71.31 | 9.70 | 71.38 | 9.61 |
| 15 | 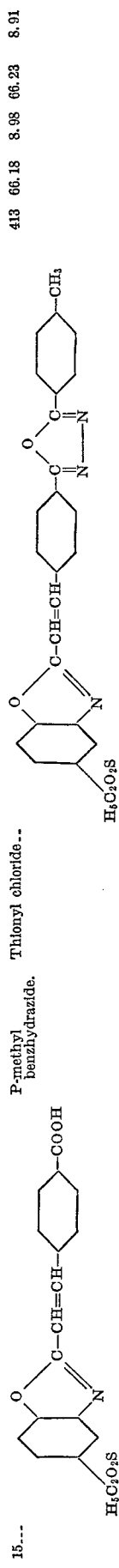 | P-methyl benzhydrazide. Thionyl chloride. | 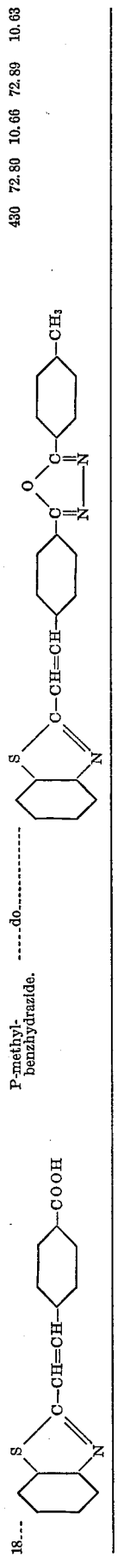 | 413 | 66.18 | 8.98 | 66.23 | 8.91 |
| 16 | 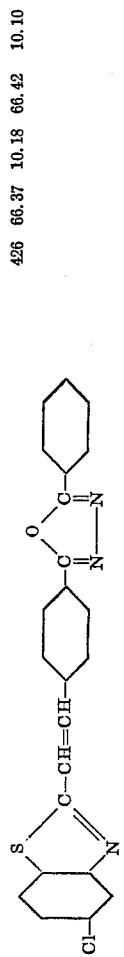 | P-isobutyl-benzhydrazide. ...do... | 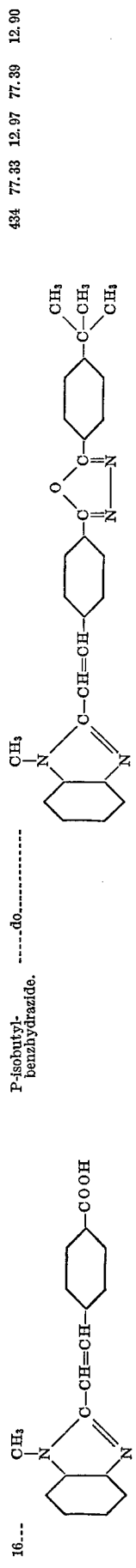 | 434 | 77.33 | 12.97 | 77.39 | 12.90 |
| 17 | 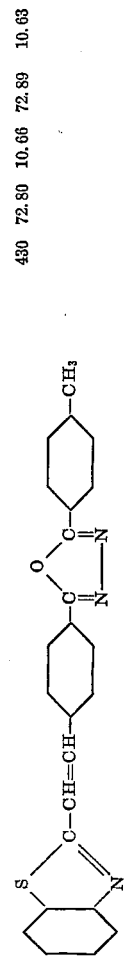 | Benzhydrazide. ...do... | 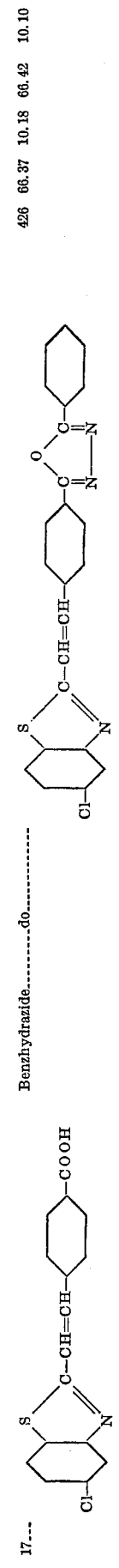 | 426 | 66.37 | 10.18 | 66.42 | 10.10 |
| 18 | 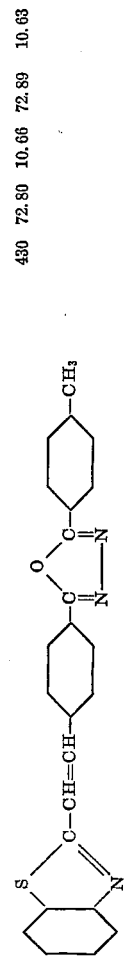 | P-methyl-benzhydrazide. ...do... | 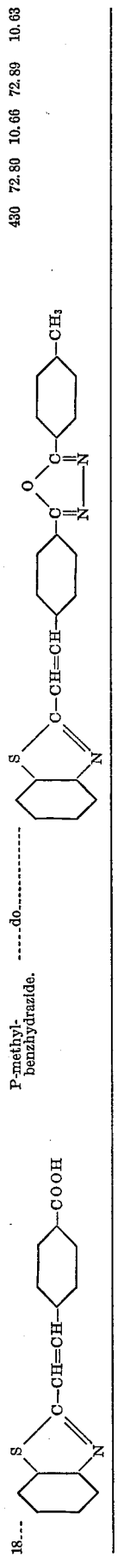 | 430 | 72.80 | 10.66 | 72.89 | 10.63 |

Example 19

The process of Example 1 was repeated using 8.3 g. of a compound represented by the formula,

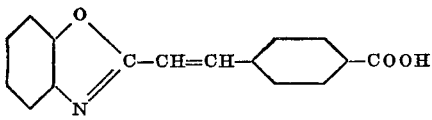
(21)

instead of 8.7 g. of the compound of formula (16) and using 5.7 g. of 4-methoxybenzhydrazide instead of 4.7 g. of benzhydrazide and a compound of the formula,

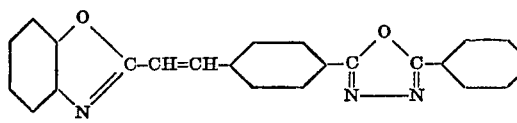
(22)

was obtained.

Analysis: C 72.77%, N 10.35%
Calculation: C 72.90%, N 10.63%
$F_{max}$: 413 m$\mu$ (0.000025 g./l. dioxane)

This compound was superior to the compound of Example 3 in the light fastness of an aqueous dispersion thereof and optically brightening effect. For example, when a Tetoron fabric was treated with an aqueous dispersion of the respective compound prepared by the aid of a polyoxyethylene ether type surface active agent at 130° C. for one hour, 0.16% of the compound of Example 3 based on the weight of the fabric had to be used to obtain the same whiteness as obtained with 0.1% of the compound of formula (22). Thus, the compound of formula (22) could provide practically satisfactory optically brightening effect.

Example 20

10.3 g. of a compound represented by the formula,

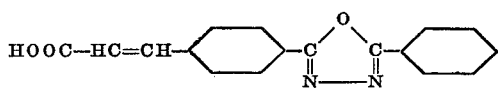

was stirred in 200 cc. of toluene and 5.6 g. of thionyl chloride at the boiling point with stirring until the mixture stopped generating hydrochloric acid gas, and then 50 cc. of toluene was distilled out to remove excess thionyl chloride. After cooling the residue to room temperature, 4.9 g. of 4-methyl-2-aminophenol was added with stirring and the reaction was carried out for 4 hours at the boiling point. The mixture was cooled and the precipitate was filtered, washed with methanol and dried. About 13 g. of a compound of the formula,

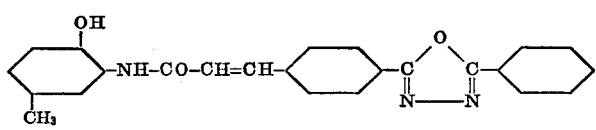

was obtained.

The 13 g. of carboxylic acid amide thus obtained was boiled in 200 cc. of o-dichlorobenzene and 0.7 g. of boric acid for 6 hours while removing the water generated from the reaction system. After cooling, the precipitate was filtered, washed with methanol and dried, whereupon about 10 g. of a compound of the formula,

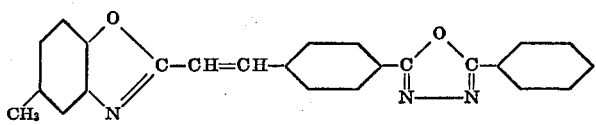

was obtained. By recrystallizing the compound thus obtained from o-dichlorobenzene, a light yellow crystal having a melting point of 241° to 243° C. was obtained.

Analysis: C 75.93%, N 11.10%
Calculation: C 75.97%, N 11.08%
$F_{max}$: 416 m$\mu$ (0.000025 g./l. dioxane)

The carboxylic acid compound used as the starting material in this Example is prepared in the following manner.

A mixture of 9.6 g. of cinnamonitrile-4-carboxylic acid chloride, 6.8 g. of benzhydrazide and 8 g. of pyridine is heated to 100° C. over a period of about 30 minutes in 100 cc. of chlorobenzene with stirring and the reaction was carried out for 2 hours at 100° to 110° C. After cooling, the precipitate is filtered and dried, and a compound of the formula,

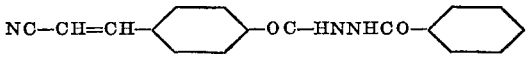

is obtained.

15 g. of the compound thus obtained is heated to 160° C. in 100 cc. of dichlorobenzene and 6 g. of thionyl chloride and the reaction is carried out until the mixture becomes completely dissolved. Upon cooling and filtering the resulting precipitate, a compound of the formula,

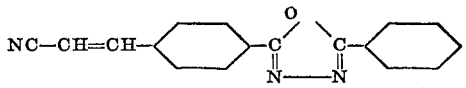

is obtained.

10 g. of this compound is reacted with 100 g. of 70% sulfuric acid for 8 hours at a temperature not lower than 100° C. and after cooling the mixture is poured into ice-water and a compound of the formula,

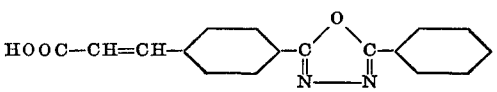

is obtained.

Example 21

A mixture of 10.7 g. of a compound represented by the formula,

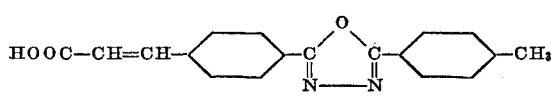

200 cc. of o-dichlorobenzene and 5.6 g. of thionyl chloride was heated to 140° to 150° C. until it stopped generating hydrochloric acid gas and excess thionyl chloride was removed by vacuum distillation along with 50 cc. of o-dichlorobenzene. 4.9 g. of 4-methyl-2-aminophenol was added to the residue and the reaction was carried out at 140° to 150° C. for 4 hours with stirring. 0.5 g. of p-toluene sulfonic acid was added to the carboxylic acid amide produced, without isolating the latter from the reaction system and the reaction was carried out at the boiling point while removing the water generated by distillation. After 4 hours of reaction, the mixture was cooled and the precipitate was filtered and washed with methanol. 12 g. of a compound of the formula,

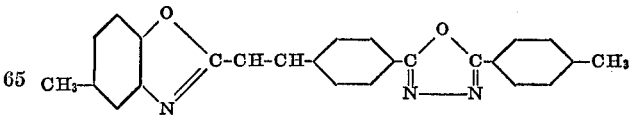

was obtained.

By recrystallizing the compound from o-dichlorobenzene, a light yellow crystal having a melting point of 264° to 265° C. was obtained.

Analysis: C 76.29%, N 10.70%
Calculation: C 76.32%, N 10.68%
$F_{max}$: 418 m$\mu$ (0.000025 g./l. dioxane)

The starting material in this Example, that is, carboxylic acid compound, may be prepared in the same manner as described in Example 20, using p-methyl benzhydrazide instead of benzhydrazide. Alternatively, it may be prepared in the following manner.

25.1 g. of a compound of the formula

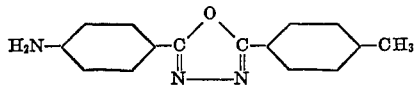

is diazotized in the usual manner and neutralized with sodium acetate. The resultant solution is poured into a mixture of 10.8 g. of maleic anhydride and 200 cc. of acetone at room temperature, to which is added a solution of 5 g. of cupric chloride in 20 cc. of water. The mixture is heated to 50° C. after the generation of nitrogen gas has stopped and diazonium salt has been dissipated. The reaction product is filtered and extracted wtih sodium carbonate, and after adding hydrochloric acid the precipitate is filtered to otbain a compound of the formula,

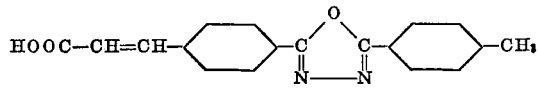

Example 22

1 Part of the compound represented by formula (18) was thoroughly mixed with 99 parts of polyoxyethylene ether-type surface active agent to prepare a sample material. 1 Part of said sample material per 10 parts of a Tetoron fabric was thrown into 300 parts of water containing 1.5 parts of chlorobenzene-type carrier to obtain a dispersion. The Tetoron fabric was immersed in said dispersion at 100° C. for 60 minutes, and thereafter the Tetoron fabric thus treated was washed with water and dried. The Tetoron fabric showed a remarkable brightening effect as compared with untreated fabric.

Similarly, remarkably brightened fabrics were obtained by the use of the azole compounds produced in Examples 2, 3, 11 and 21.

Example 23

A dispersion was prepared by dissolving 0.1 part of the compound represented by formula (18) in 100 parts of dioxane with heat and pouring the resultant solution into a mixture of 12 parts of polyoxyethylene ether-type surface active agent and 3000 parts of water. 100 parts each of nylon, vinylon, acetate, polypropylene and cotton fabrics were individually immersed in the dispersion at 95° C. for 45 minutes. After washing the individual treated fabrics with water and drying, fabrics of bluish white color were obtained which were much brighter than untreated fabrics. The acetate fabric in particular gave a special brightness of purple color.

Similarly, excellent brightening effects were obtained by the use of the azole compounds produced in Examples 7, 14, 17 and 18, instead of the compound of formula (18).

Example 24

0.01 Part of the compound represented by formula (18), which was produced in Example 1, was mixed with 100 parts of polyethylene and the mixture was kneaded homogeneously on a roll heated to 130° C. and then pressed into a sheet, whereby a polyethylene sheet having a bright bluish fluorescence was obtained.

Similarly, excellent brightening effects were obtained by using the azole compounds produced in Examples 2, 6 and 9.

Example 25

1 Part of the compound which was produced in Example 21 was mixed with 9 parts of dioctyl phthalate to prepare a sample material. 0.1 Part of the sample material was mixed with 100 parts of polyvinyl chloride, 0.2 part of titanium oxide and 3 parts of a tin-type stabilizer. After kneading with a roll previously heated to 170° C., the mixture was pressed into the shape of a sheet, whereby a polyvinyl chloride sheet having extremely high brightness was obtained.

What is claimed is:

1. A compound represented by the formula,

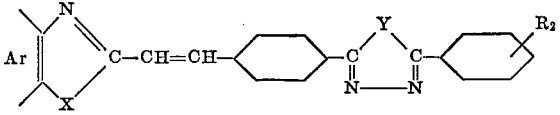

wherein

Ar is unsubstituted benzene nucleus, unsubstituted naphthalene nucleus or benzene nucleus substituted by one methyl, methoxy, ethoxy, chlorine, phenyl, carboethoxy or ethylsulfonyl group;

$R_2$ is a hydrogen or chlorine atom or a lower alkyl or methoxy group;

X is oxygen, sulfur, NH group or N—$CH_3$ group; and

Y is oxygen or sulfur.

2. A compound of Claim 1, which is represented by the formula,

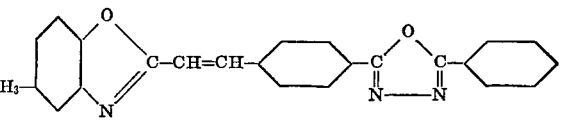

3. A compound of Claim 1, which is represented by the formula,

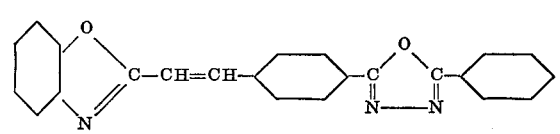

4. A compound of Claim 1, which is represented by the formula,

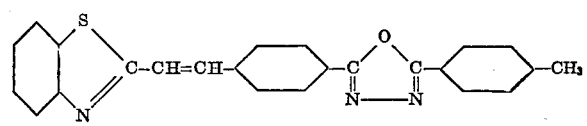

5. A compound of Claim 1, which is represented by the formula,

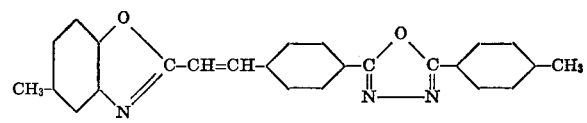

6. A compound of Claim 1, which is represented by the formula,

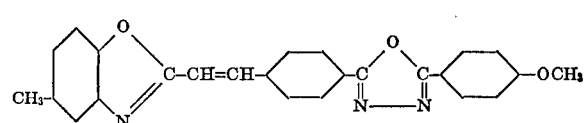

7. A compound of Claim 1, which is represented by the formula,

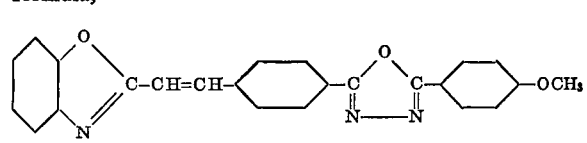

8. Compounds of the Formula I

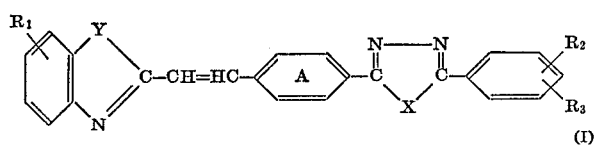

(I)

wherein

X and Y represent independently oxygen or sulphur, and $R_1$ and $R_2$ represent independently hydrogen, an alkyl group having 1 to 4 carbon atoms, the phenyl group or a phenyl group substituted by chlorine, alkyl groups having 1 to 4 carbon atoms or alkoxy groups having 1 to 4 carbon atoms, or alkoxy groups having 1 or 2 carbon atoms, or chlorine, and $R_3$ represents hydrogen or chlorine.

9. Compounds according to Claim 3, wherein $R_1$ represents hydrogen, an alkyl group having 1 to 4 carbon atoms, or the methoxy group, $R_2$ represents hydrogen, an alkyl group having 1 to 4 carbon atoms, the methoxy group or chlorine and $R_3$ represents hydrogen or chlorine.

10. A compound as claimed in Claim 8 which has the formula

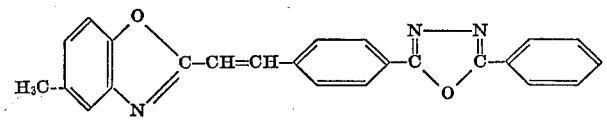

11. A compound as claimed in Claim 8 which has the formula

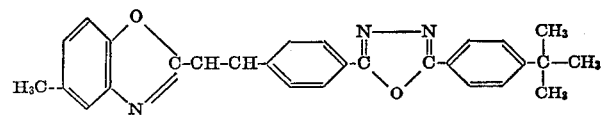

12. A compound as claimed in Claim 8 which has the formula

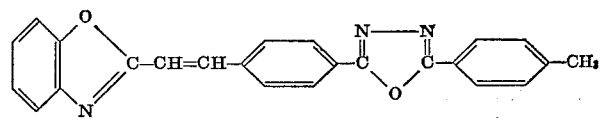

References Cited
UNITED STATES PATENTS 3,635,960   1/1972   Di Giovanoel et al. _ 260—240 D JOHN D. RANDOLPH, Primary Examiner U.S. Cl. X.R.

106—176; 117—33.5 R, 33.5 T; 252—301.2 W, 543; 260—75 T, 77.5 D, 78 SC, 88.7 R, 92.8 A & R, 93.5 A & R, 141, 157, 240.9, 240 J, 307 R and G, 469, 471, 558 H